Figure 1:
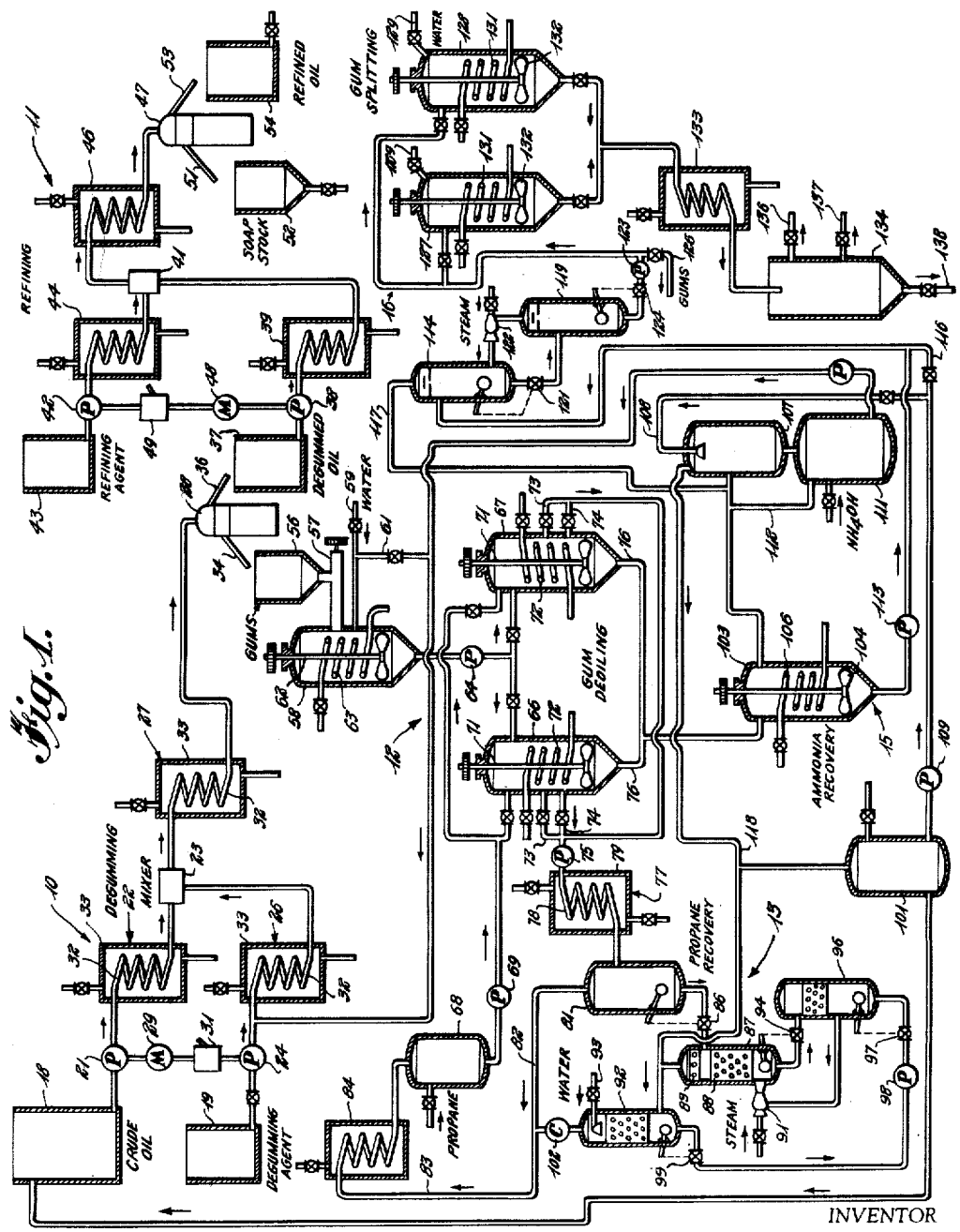

May 11, 1954 — B. CLAYTON — 2,678,327
PROCESS OF TREATING GLYCERIDE OIL
Filed Dec. 12, 1950

INVENTOR
Benjamin Clayton
BY Harris, Kiech, Foster & Harris
ATTORNEYS

Patented May 11, 1954

2,678,327

UNITED STATES PATENT OFFICE 2,678,327

PROCESS OF TREATING GLYCERIDE OIL

Benjamin Clayton, Pasadena, Calif.

Application December 12, 1950, Serial No. 200,460

16 Claims. (Cl. 260—428.5)

This invention relates to a process of treating glyceride oil, and more particularly, to a process in which a crude glyceride oil is degummed with an aqueous agent prior to alkali refining and the gums separated from the oil during degumming are treated to recover a high quality crude oil and high quality de-oiled gums which may form a commercial product or which may be further treated to recover valuable products therefrom.

In the refining of glyceride oils, the most widely used process involves adding aqueous alkali to the crude oil in an amount sufficient to neutralize the acidity of the oil plus a substantial excess. In commercial refining operations the alkali usually employed is either caustic soda or soda ash followed by a wash with caustic soda. The free fatty acids in the crude oil are converted into soap and the gums are precipitated. The resulting soap and precipitated materials, along with water and excess alkali are separated from the oil as soapstock. In most cases the soapstock also contains a considerable quantity of neutral oil. The soapstock is a low grade material, and, in general, it is not practicable to recover either the oil or the gums as such. Instead the soapstock is treated with strong acids to neutralize the alkali and liberate the fatty acids. In the acid treating operation, the gums are decomposed and charred by the strong acid and neutral oil is split. The resulting product is an impure product known as black grease. Fatty acids are recovered from the black grease by distillation, usually involving several distillation steps.

Considerable quantities of certain of the vegetable oils, namely soyabean and corn oil, have been degummed prior to alkali refining in order to produce what is known commercially as vegetable oil lecithin or vegetable oil phosphatides. The degumming is carried out by continuously adding an aqueous reagent such as water alone or aqueous solutions of electrolytes to the oil and continuously centrifugally separating. The usual reagent employed is water in an amount which is approximately 3% by weight of the oil. The water hydrates the gums to render them insoluble in the oil so as to enable their separation. The hydrated gums are centrifugally separated from the oil and usually contain in the neighborhood of 50% water by weight and a considerable portion of neutral oil. These hydrated gums are dried at low temperatures under vacuum conditions to produce commercial vegetable oil lecithin, this material being about 60 to 70% by weight phosphatidic material and about 30 to 40% crude oil as a carrier, minor amounts of other materials such as sterol glycosides, inositides, etc., forming part of the phosphatide complex being included within the 60 to 70% given above. Although the commercial lecithin referred to has many uses in the arts, the supply considerably exceeds the demand and much of even the soyabean and corn oil is not degummed prior to alkali refining. Also degumming operations have not been commercially employed on crude oils such as cottonseed oils, the gums from which are not of as high a quality as those from soyabean and corn oil. That is to say, degumming operations involve a loss of neutral oil and unless this oil can be recovered and valuable products obtained from the de-oiled gums, it is more economical to separate the gums as part of the soapstock and recover only the fatty acid component thereof while discharging the remainder to waste.

In accordance with the present invention, a process by which the gums recovered from a degumming operation may be de-oiled in a practical commercial process on a large scale to recover the oil normally lost with the phosphatides is provided and this process may also include the subsequent treatment of the de-oiled gums to recover valuable products therefrom. The crude oil separated from the gums is a high quality crude and may be returned to the original oil being refined so that the larger part of this crude oil eventually is recovered as refined neutral oil. The gums or phosphatidic materials are recovered in non-degraded form and in the case of soyabean, corn and certain other oils, may be employed for the same purposes as vegetable oil lecithin. Since the supply of commercial phosphatides or lecithin exceeds the demand, as stated above, it is preferred to subject the de-oiled gums to a splitting operation so as to recover valuable products therefrom in addition to high quality fatty acids. This is particularly true in the case of gums such as cottonseed oil gums which are not suitable for use as commercial lecithin. The alkali refining of a degummed oil results in less loss of oil in the soapstock and the production of a soapstock from which it is much easier to recover fatty acids because of the substantial absence of gums in the soapstock. These factors have, however, been more than counterbalanced by the loss of oil in the degumming operation and the increased cost of additional apparatus necessary for degumming.

It has been previously proposed to remove the oil from gums by first drying the gums and then employing a solvent such as acetone in which the oil is soluble and the phosphatidic material and other associated material is insoluble. Such operation includes an expensive drying step and also expensive solvents and solvent recovery steps and has not proved commercially practicable. Also the oil recovered is a very low grade highly colored crude oil.

In accordance with the present invention, the hydrated gums containing glyceride oil, without drying and preferably in the presence of added water, are subjected to treatment with a liquefied normally gaseous hydrocarbon. By a liquefied normally gaseous hydrocarbon is meant a hydrocarbon or mixture of hydrocarbons which is in vapor form at atmospheric pressure and atmospheric temperature, for example 70° F. but which can be liquefied at temperatures up to 200° F. by practical pressures, for example 600 lbs. per square inch gauge. Propane is typical of such hydrocarbons and the process will be described with reference thereto but other hydrocarbons including commercial mixtures having a boiling point similar to that of propane may be employed. The treatment with the liquefied normally gaseous hydrocarbon is preferably carried out in the presence of ammonia in sufficient amount to neutralize the acidity of the gums including any free fatty acids present therein. While ammonia is the preferred material for neutralizing the acidity of the gums and the process will be described with reference thereto, any of the volatile water-soluble amines such as the lower alkyl and alkylol amines may be employed, ammonia being considered to be the lowest member of such series of amines. In the presence of such volatile water-soluble alkaline material and water the gums as well as any free fatty acids in the form of water-soluble soaps, are present in a heavier aqueous phase and the oil is in solution in a lighter solvent phase. A separation between the two phases may be carried out at room temperature or below, i. e., any temperature above the freezing point of water in the mixture and also the separation temperature may be higher than room temperature, for example, temperatures as high as 100° or 120° F. It is possible to carry out the separation in the absence of ammonia, in which case two separable phases form at temperatures ranging between approximately 120° and 200° F., the preferred range of temperatures being in the neighborhood of 150° and 170° F. In this case the free fatty acids are in the lighter phase along with the oil. In either case the liquefied hydrocarbon is relatively easily separated from the oil and a high quality crude oil capable of being refined to a high quality neutral oil is recovered without damage to the phosphatidic materials and other products contained in gums. The recovered oil is, however, of better quality when ammonia is employed as it is then substantially free of free fatty acids.

It is therefore an object of the present invention to provide an improved process of treating glyceride oils in which a high quality crude oil is recovered from hydrated gums separated from a glyceride oil in a degumming operation.

Another object of the invention is to provide an improved process of de-oiling hydrated gums obtainable by degumming a glyceride oil in which a liquefied normally gaseous hydrocarbon is employed to enable separation of the oil from the gums.

Another object of the invention is to provide an improved process of de-oiling hydrated gums in which a liquefied normally gaseous hydrocarbon is employed along with ammonia to effectively separate a high quality crude oil from the gums at temperatures not substantially higher than room temperatures.

A further object of the invention is to provide an improved process in which a high quality crude oil is recovered from hydrated gums without damage to the gums themselves including the phosphatidic material making up the greater portion of the gums.

A still further object of the invention is to provide an improved process of separating oil from hydrated gums in which the separated gums may be further treated to recover valuable products therefrom.

Figure 2:
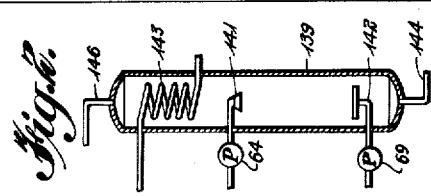

Other objects and advantages of the invention will appear in the following detailed description thereof given in connection with the attached drawing in which:

Fig. 1 is a schematic diagram of suitable apparatus for carrying out the process of the present invention; and Fig. 2 is a similar view of modified apparatus suitable for the de-oiling step.

Referring to Fig. 1 of the drawing, apparatus useful in carrying out the process of the present invention may include a degumming portion indicated generally at 10, an alkali refining portion indicated generally at 11, and a gum de-oiling portion indicated generally at 12 wherein the hydrated gums are preferably treated with both propane and ammonia in order to separate oil from the gums. The apparatus may also include a propane recovery portion indicated generally at 13, an ammonia recovery portion indicated generally at 15 and a gum splitting portion indicated generally at 16.

The degumming apparatus 10 may include a source of supply for crude oil shown as a tank 18 and a source of degumming agent shown as a tank 19. The crude oil from the tank 18 may be withdrawn therefrom by means of a pump 21 and passed through a heat exchange device 22 to a mixer 23. Degumming agent may be withdrawn from the tank 19 by means of a pump 24, passed through a heat exchange device 26 and delivered to the mixer 23. The combined stream constituting oil and precipitated hydrated gums may be passed through another heat exchanger 27 and delivered into a continuous centrifugal separator 28. The pumps 21 and 24 may constitute a part of a proportioning apparatus and these pumps may, for example, be driven by a variable speed motor 29 with a speed change device 31 positioned between the motor 29 and the pump 24. Any other suitable type of proportioning mechanism may, however, be employed.

The degumming agent is ordinarily water although substantially any electrolyte which will not damage the oil may be dissolved in the water including acids, bases or neutral salts, very dilute solutions of strong acids or strong bases usually being employed when these materials form part of the degumming agent. For purposes of the present invention, water or water containing ammonia are the preferred degumming agents. The heat exchange devices 22, 26 and 27 may be of the type shown, in which the materials being heated are passed through coils 32 positioned in casings 33 through which any desired heat exchange medium may be passed, for example steam. The heat exchange devices may, however, be of any suitable type adapted to heat the oil, aqueous degumming agent or mixture thereof in stream flow. These heat exchangers are ordinarily employed to raise the temperatures of the materials to suitable mixing and separating temperatures. The mixture entering the centrifugal separator may be at a temperature between 120° and 190° F. and usually approximately 150° F. since this has been found to be an effective temperature for separating the hydrated gums as a heavier aqueous phase from the degummed oil and a portion of the heat is usually imparted to the oil and degumming agent prior to mixing. The hydrated gums are discharged as the heavier aqueous effluent from the centrifugal separator 28 through a spout 34 and the degummed oil is discharged as the lighter effluent through a spout 36 into a receptacle 37.

Alkali refining apparatus 11 is also shown in order to illustrate a complete process of recovering a refined glyceride oil. A pump 38 may be employed to withdraw the degummed oil from the receptacle 37 and pass it through a heat exchanger 39 to a mixer 41. A pump 42 may be employed to withdraw an aqueous solution of a suitable alkali such as caustic soda from a tank 43 and deliver the same through a heat exchanger 44 to the mixer 41. The resulting mixture may then be passed through another heat exchanger 46 and delivered to a continuous centrifugal separator 47. The pumps 38 and 42 may be similar to the pumps 21 and 24 and may be driven by a variable speed motor 48 and have a speed change device 49 connected between the motor 28 and the pump 42.

The heat exchangers 39, 44 and 46 may be employed to bring the oil and the refining agent to a correct mixing temperature and the heat exchange 46 may be employed to bring the mixture to a desired separation temperature. These heat exchangers may be similar to the heat exchangers 22, 26 or 27. Enough alkali refining agent is ordinarily employed to neutralize the free fatty acids and provide an excess. The resulting soapstock is separated from the oil in the centrifugal separator 47 as the heavier aqueous phase and may be delivered through a spout 51 into a receptacle 52. This soapstock is of high quality since the gums have been previously separated from the oil and such soapstock may be readily converted into relatively high quality free fatty acids by mere acidulation of the soapstock with a strong mineral acid and separating the insoluble fatty acids from a heavier aqueous phase. This separation may be performed either by settling or continuous centrifugal separation. The refined neutral oil may be delivered from the centrifugal separator 47 through a spout 53 into a receptacle 54.

The apparatus disclosed for alkali refining is that conventionally employed for continuous alkali refining employing caustic soda as the refining reagent. This apparatus is merely representative of alkali refining apparatus and further details as to commercial alkali refining operations employing caustic soda or soda ash both can be found in the patents to Clayton et al. No. 2,100,274, granted November 23, 1937; Clayton et al. No. 2,100,275, granted November 23, 1937; and Clayton No. 2,190,593, granted February 13, 1940.

The gums discharged from the centrifugal separator 28 through the spout 34 may be collected in a hopper 56. Such gums will ordinarily contain in the neighborhood of 45 to 55% water and are a thick viscous material. With this amount of water, they do not flow readily and the hopper 56 is shown as being connected at its lower end to a screw conveyor 57 for delivering the gums into a closed mixing chamber 58. In the chamber 58 the gums are preferably diluted with water and also ammonia is preferably added to the gums if not previously added in the degumming operation. The diluting water, if employed without ammonia, may be added through the pipe 59 and if both water and ammonia are to be added, aqueous ammonia may be added through the pipe 61. Gums containing sufficient ammonia to neutralize their acidity including any free fatty acids present flow readily at substantially any temperature above the freezing point of water when they also contain 60 to 75% water or more whereas gums containing this amount of water and no ammonia require a temperature of about 140° F. or higher to cause them to flow readily. At this temperature gums containing no ammonia flow readily when they contain less than about 30% water or above about 65 to 70% water.

In general, the chamber 58 is employed to dilute the gums with water until they contain approximately 65 to 70% water and to bring the diluted gums to the desired temperature for further treatment. It may additionally be employed to add ammonia, if employed, and not already present in the gums. The chamber 58 may be provided with an agitator 62 driven from any suitable source of power and with a heat exchange coil 63 through which any desired heating or cooling medium may be passed. The gums will usually enter the chamber 58 at a temperature in the neighborhood of 130° to 140° F. and if ammonia is employed this temperature is preferably reduced to a temperature within the range of 70° to 100° F. The agitator 62 serves to mix the water or aqueous ammonia thoroughly with the gums. If no ammonia is employed the coil 63 may be employed to bring the temperature of the aqueous gums to a temperature between 150° and 170° F.

The aqueous gums may be withdrawn from the mixing chamber 58 by means of a pump 64 and delivered to one or the other of a pair of de-oiling chambers 66 and 67. That is to say, the closed chambers 66 and 67 may be employed alternately for separating oil from the gums. Liquefied propane under pressure and at a temperature ranging from approximately room temperature up to 120° F. may be withdrawn from a propane supply tank 68 by means of a pump 69 and delivered into the chambers 66 and 67. That is to say, a charge of hydrated gums may, for example, be delivered into the chamber 66 and then a charge of propane from the tank 68. The chambers 66 and 67 are pressure-tight and capable of resisting internal pressure. They may each be provided with an agitator 71 driven from any suitable source of power and with a heating or cooling coil 72 for maintaining a desired temperature in the chambers. The hydrated gums may be thoroughly admixed with the propane and then the mixture allowed to settle.

The mixture settles into an upper oil layer which may be withdrawn through the pipes 73 and 74 and delivered to the propane recovery system. When ammonia is employed, this upper layer is essentially a solution of crude oil in propane and may be delivered to a propane recovery system for separating the propane from the oil by a pump 75. When no ammonia is employed this phase also contains any free fatty acids which were present in the separated gums. The lower layer is essentially an aqueous phase containing dissolved or suspended phosphatidic material and other materials soluble or suspendible in water and insoluble in the propane under the conditions existing in the chambers 66 and 67. When ammonia is present, the aqueous phase also contains the free fatty acids in the form of ammonia soaps. This lower phase may be withdrawn from the chambers 66 and 67 through pipes 76 and if ammonia is employed, the lower phase may be delivered to the ammonia recovery apparatus 15.

The propane recovery apparatus 13 may include a heat exchange device 77 and may be provided with a coil 78 positioned in a casing 79 through which any desired heating medium may be passed. The oil-solvent phase is heated in the heat exchange device and delivered into the flash chamber 81. The propane-oil mixture will drop to a lower temperature due to the vaporization of propane and the propane vapors may be delivered through pipes 82 and 83 to a condenser 84 wherein the propane vapors are passed in indirect heat exchange relation with any suitable cooling medium and the resulting liquid propane may be returned to the propane supply tank 68.

A series of heat exchange devices 77 and flash chambers 81 may be employed if necessary to reduce the propane content of the oil to a low value. The oil containing a small amount of propane may be withdrawn from the lower portion of the flash chamber 81 or the last flash chamber of the series above mentioned under control of a float valve diagrammatically indicated at 86 and delivered into a steam stripping chamber 87 which may be operated at a relatively low pressure. The chamber 87 may be provided with packing indicated at 88 and 89 and steam may be introduced into the lower portion thereof through a steam vacuum pump or vacuum booster 91. Additional propane vapors stripped from the oil and steam vapors may be delivered from the upper portion of the chamber 87 into a jet condenser 92. Water may be delivered into the upper portion of the jet condenser 92 through a pipe 93.

The oil in the lower portion of the stripping chamber 87 may be withdrawn therefrom under control of a float valve diagrammatically indicated at 94 and delivered into the upper portion of a vacuum stripper chamber 96. A vacuum is produced in the chamber 96 by means of the steam vacuum pump 91 and vapors withdrawn from the oil in the vacuum stripper chamber 96 are thus delivered into the steam stripper 87 and then into the condenser 92. The oil from which the propane vapor has been substantially entirely stripped in the vacuum stripper 96 may be withdrawn from the vacuum stripper 96 under control of a float valve indicated diagrammatically at 97 and pumped by means of a pump 98 back to the crude oil supply tank 18.

Water from the jet condenser 92 may be withdrawn from the lower portion thereof under control of a float valve indicated diagrammatically at 99 and delivered to a water storage tank 101. Any small amount of ammonia, if used, which may be retained in the oil layer separated from the aqueous phase in the chambers 66 or 67 is stripped from the oil in the steam stripping chamber 87 and vacuum chamber 96 and appears in the water delivered to the water storage tank 101. As described, this water may be re-used in the process and the ammonia thereby returned to the process. Propane vapors collecting in the top of the condenser 92 are under a relatively low pressure and these vapors may be compressed by a compressor 102 to the pressure in the propane storage system and delivered through the pipe 83 to the condenser 84 along with vapors from the flash chamber 81.

If ammonia is employed in the process, as is the case in the preferred process, the aqueous phase containing aqueous ammonia and oil-free gums may be delivered into the ammonia vaporizing chamber 103. This chamber may be closed to the atmosphere and be provided with an agitator 104 and a heating coil 106. In the chamber 103 the aqueous material is preferably subjected to temperatures in the neighborhood of the boiling point of water at atmospheric pressure or somewhat above and the pressure is maintained at approximately the pressure in the condenser 92 as explained below. Ammonia in solution in the aqueous phase and combined with free fatty acids is liberated from the aqueous phase and the resulting ammonia vapor may be delivered to an absorption chamber 107 into which water may be sprayed through the pipe 108. This water may be a portion of the water returned from the jet condenser 92 to the storage tank 101 and may be pumped from the storage tank 101 by means of a pump 109. The resulting aqueous ammonia may be collected in a receiving receptacle 111 which may be vented back to the absorption chamber 107 by means of a pipe 112. The aqueous ammonia collected in the receiving receptacle 111 may be re-used in the process as later described.

The aqueous phase containing the de-oiled gums from which a major portion of the ammonia has been removed in the chamber 103 may be pumped therefrom by means of a pump 113 and delivered into a steam stripping chamber 114. It is usually desirable to somewhat further dilute the de-oiled gums withdrawn from the ammonia recovery chamber with water to make them flow more readily and assist in the gum splitting operation, if employed, and this may be accomplished by adding water from the tank 101 through the pipe 116. The de-oiled gums from the chamber 103 will also usually contain a small amount of propane and any propane vapors along with ammonia vapors liberated in the steam stripper 114 may be returned to the absorber 107 through the pipe 117. The ammonia absorber 107 as well as the water storage tank 101 may also be vented back to the condenser 92 so that any propane vapors which might collect in such absorber or tank are also returned to the propane system by way of the condenser 92. The steam stripper 114 may be associated with a vacuum stripper 119. That is to say, the aqueous suspension of gums may be withdrawn from the steam stripper 114 under control of a float valve indicated diagrammatically at 121 and delivered into the vacuum stripper 119. A steam vacuum pump 122 may be employed to produce a vacuum in the vacuum stripper 119 and introduce steam and any vapors liberated in the vacuum stripper 119 into the steam stripper 114. Such vapors ultimately reach the absorber 107 or the jet condenser 92.

The aqueous suspension of gums substantially free of ammonia and propane which collects in the lower portion of the vacuum stripper 119 may be removed therefrom by means of a pump 123 under control of a float valve indicated diagrammatically at 124. These de-oiled gums are high quality undecomposed gums and may be removed from the process through the pipe 126 and dried to produce high quality de-oiled gums containing free fatty acids and are suitable for many commercial uses.

The gums are, however, preferably subjected to a gum splitting operation in the apparatus indicated generally at 16. The gums may be delivered alternately into the splitting chambers 127 and 128 wherein they are subjected to elevated temperatures in the presence of water for a considerable period of time. That is to say, one of the splitting chambers 127 may be filled while the chamber 128 is being employed to split the gums and also while the latter chamber is being emptied. Additional water to further the splitting operation may be added to the splitting chambers 127 through pipes 129 and the splitting chambers may be provided with heating coils 131, through which any desired heating medium may be passed, and agitators 132.

The split products delivered alternately from the chambers 127 and 128 may be cooled to a temperature below the boiling point of water in the heat exchanger 133 and delivered to a settling chamber 134. In the settling chamber the material settles into an upper fatty layer which is largely fatty acids containing a minor proportion of sterols and still smaller amounts of unidentified fatty materials; a lower aqueous layer containing glycerine, inositol, choline and various unidentified phosphorous-containing compounds and a small amount of an intermediate layer in which the compounds have also not been identified. These layers may be separated and withdrawn through the various pipes 136, 137 and 138 and the various materials in the upper and lower layers further separated and recovered. Continuous centrifugal separation may be employed instead of settling, in which case the intermediate layer divides between the fatty layer and the aqueous layer representing the lighter and heavier effluents, respectively, with most of it discharging with the lighter effluent.

The apparatus shown in Fig. 2 may be substituted for the two de-oiling chambers 66 and 67 in the apparatus of Fig. 1. The apparatus of Fig. 2 includes a tower 139 capable of withstanding the pressure employed in the de-oiling step in which propane is employed. The aqueous gums from the mixer 58 of Fig. 1 either containing ammonia or free from ammonia may be continuously delivered into the tower by the pump 64 through the distributor 141. Liquefied propane may be continuously delivered from the tank 68 by the pump into a lower portion of the tower 139 through a distributor 142. Also the tower may contain a heating coil 143 for maintaining a desired temperature in the tower. The hydrated gums, water and ammonia soaps, if ammonia is employed, settle to the bottom of the tower through the ascending propane and are withdrawn continuously through the pipe 144 for delivery to an ammonia recovery chamber such as the chamber 103 of Fig. 1. The lighter propane moving upwardly washes the oil from the gums and an oil-propane phase may be withdrawn through the pipe 146 and delivered to the heat exchanger 77 of Fig. 1 forming part of the propane recovery system.

At least three modifications of the process of the present invention may be carried out in the degumming and de-oiling portions of the apparatus of Fig. 1. In the preferred process, no ammonia is employed in the degumming operation and ammonia is added to the gums in the mixing chamber 58 so as to be present during the de-oiling step. In the second modification ammonia may be employed in the degumming operation in which case the ammoniated gums are delivered into the mixing chamber 58 so that again ammonia is present in the de-oiling step. In a third modification no ammonia is employed in the process and de-oiling of the gums is effected with liquid propane at a higher temperature.

In the preferred modification, the degumming agent is preferably water and the amount of water employed ranges from about 2 to 10% and is usually about 3% by weight based on the weight of the crude oil. A stream of water is continuously admixed with a stream of the oil in the mixer 23 and the heat exchangers 22, 26 and 27 are employed to bring the temperature of the mixture up to a desired separation temperature. This temperature is usually approximately 150° F. but temperatures ranging from 120° to 190° F. are applicable. A portion of the heat necessary to produce this temperature is usually imparted to the materials in each of the heat exchangers 22, 26 and 27 but all of the heating can be done before mixing or alternatively, all of it can be done after mixing. The water hydrates the gums and causes them to become insoluble in the oil. An aqueous heavier effluent containing the gums is discharged from the centrifugal separator through the spout 34 into the hopper 56.

The gums will usually contain in the neighborhood of 45 to 55% water and are a thick viscous material which does not readily flow within the temperature range above mentioned. These gums may, however, be delivered into the closed mixing chamber 58 by a screw conveyor 57 and aqueous ammonia is preferably delivered into the mixing chamber 58 from the ammonia storage tank 111 through the pipe 61. The amount of ammonia is preferably just sufficient to neutralize the acidity of the gums, i. e., to raise the pH of the aqueous phase above 7 although an excess of ammonia may be employed. The amount of water should be at least sufficient to raise the water content of the mixture up to 65 to 70% and in the presence of ammonia the gums flow readily at any temperature above the freezing point of the water in the mixture. The agitator 62 serves to thoroughly mix the water and ammonia with the gums to thus enable any further fatty acids present to be neutralized and form ammonia soap. The mixing chamber 58 is preferably operated continuously and may be of relatively small size. The coil 63 in the mixer may be employed to lower the temperature of the mixer as the preferred treating temperature in the de-oiling chambers 66 and 67 is usually lower than the mixture produced in the mixer in the absence of cooling.

The fluid ammoniated aqueous gums can be delivered by the pump 64 to one or the other of the propane treating chambers 66 or 67. It will be appreciated that the gums may be treated with propane in one of these chambers and the chamber emptied while the other chamber is being filled. Liquid propane under pressure may be delivered into the appropriate chamber 66 or 67 by means of the pump 69 and thoroughly admixed with the aqueous ammoniated gums therein by means of the agitator 71. The amount of propane will usually range from approximately 5 to 16 volumes per volume of gums on a dry basis and is usually about 8 volumes of propane to 1 volume of gums. On the basis of the aqueous gums the amount of propane employed is about 1.5 to 6 volumes per volume of aqueous gums, the usual amount being about 3 volumes. The resulting mixture may then be allowed to settle to produce a lower aqueous phase containing the gums and ammonia soaps and an upper solvent phase containing liquid propane and oil. The preferred temperature during settling is between approximately 70° and 100° F. and the coil 63 in the mixer 58 may be employed to bring the aqueous ammoniated gums therein to a temperature within this range. Temperatures ranging anywhere between the freezing point of the water in the mixture up to approximately 120° F. may be employed during settling but there is no advantage in carrying the temperature below room temperature and the higher the temperature employed in the chambers 66 or 67, the higher the pressure required to prevent vaporization of propane. The pressure will be approximately that of the vapor pressure of propane at such temperatures, i. e., approximately 110 to 175 lbs. per square inch gauge for temperatures of 70° to 100° F.

The two phases rapidly separate when the agitator 71 is stopped and the lighter oil-solvent phase may be withdrawn through one of the pipes 73 or 74 and the aqueous phase may be withdrawn through the pipe 76. By employing a plurality of vertically spaced pipes such as the pipes 73 and 74 a relatively clean separation between the phases can be effected although an effective operation is to withdraw somewhat less than all of both of the phases so as to avoid any possibility of withdrawing a mixture of phases. The material left in the chamber representing a part of both phases will merely be added to the next charge. It is somewhat advantageous to further treat the aqueous phase with additional propane and again settle to recover additional oil.

The separated oil-solvent phase may be heated in the heat exchangers 78, the pump 75 being employed to increase the pressure sufficiently to force the material through the heater into the flash chamber 81 which may, for example, have a pressure therein of approximately 175 lbs. per square inch gauge coeresponding to a temperature of approximately 100° F. in the propane storage tank 68. The oil-solvent phase may be heated to a temperature of, for example, 250° F. in the heat exchanger 78 and propane vapors are rapidly liberated in the flash chamber 81 and condensed in the condenser 84 in which the vapors and resulting liquid propane may be cooled to, for example, 100° F. A series of heaters and flash chambers in which the temperature of the oil-solvent phase is progressively raised and progressively denuded of propane vapors may, however, be employed instead of the single heater and flash chamber illustrated.

The resulting oil containing a small amount of propane collects in the lower portion of the flash chamber 81 or the last flash chamber of the series above mentioned and may be delivered under control of the float valve 86 into the steam stripper 87. Steam is delivered into the steam stripper 87 through the vacuum pump 91 and steam and propane vapors are delivered into the jet condenser 92, the partially stripped oil collecting in the lower portion of the steam stripper 87 and being delivered into the vacuum stripper 96 under control of the float valve 94. The vacuum pump 91 produces a vacuum in the vacuum stripper 96 and any propane vapors liberated therein are delivered through the vacuum pump 91 and are carried upwardly through the steam stripper 87 into the jet condenser 92.

Oil collecting in the lower portion of the vacuum stripper 96 may be discharged therefrom under control of the float valve 97 and pumped by the pump 98 back to the supply of crude oil. The oil thus recovered from the gums is, in general, a high quality crude oil very low in free fatty acids and containing a small amount of other impurities not cleanly separated therefrom in the de-oiling step. This crude oil again passes through the degumming step and most of the recovered glyceride oil is eventually discharged from the centrifugal separator 28 through the spout 36 to the alkali refining step. Most of the impurities again are discharged with the gums and are eventually separated with the lower aqueous phase in the de-oiling step.

Water is delivered into the jet condenser 92 through the pipe 93 and any small amount of ammonia which may be discharged from the chambers 66 or 67 in the oil-solvent phase or which may circulate in the propane system eventually reaches the jet condenser 92 and appears in the water discharged therefrom under control of the float valve 99. The pressure in the jet condenser will ordinarily be a few pounds per square inch above atmospheric pressure, for example 2 to 5 lbs. per square inch gauge and the water discharged therefrom may flow by gravity or be pumped to the water storage tank 101. The temperature of this water will usually range from about 75 to 85° F. Since any propane vapors in the upper portion of the jet condenser 92 are at a lower pressure than that obtaining in the flash chamber 81, the condenser 84 and the propane storage tank 68, a compressor 102 may be employed to return such propane vapor to the propane system.

The lower aqueous phase separated in the chambers 66 and 67 may be delivered into a propane vaporizing chamber 103 and heated therein to a temperature approaching the boiling point of water at the pressure prevailing in the vaporizing chamber 103. Ordinarily the vaporizing chamber 103 will be maintained at approximately the pressure in the jet condenser 92 since this chamber is connected to the jet condenser 92 through the absorber 107 and the pipe 118 and the temperature in the chamber 103 may, for example, be approximately 210° to 220° F. The coil 106 in the vaporizing chamber 103 may be employed to heat the aqueous phase in the chamber 103. Ammonia vapors evolved in the chamber 103 are delivered into the absorber 107 into which water from the tank 101 is sprayed, this water being delivered to the absorber through the pipe 108. Aqueous ammonia is discharged into the receiver 111 and may be pumped back to the mixer 58.

The de-oiled gums from which the major portion of the ammonia has been removed will ordinarily still contain a small amount of propane and a small amount of ammonia. This material may be pumped by the pump 113 to a propane and ammonia stripping step in which the steam stripper 114 and vacuum stripper 119 are employed. The steam stripper 114 may be essentially similar to the steam stripper 87 except that the packing is ordinarily omitted and the vacuum stripper 119 may be essentially similar to the vacuum stripper 96 except that packing is also generally omitted. At the temperature obtaining in the ammonia vaporizing chamber 103 and with the amount of water present in the gums therein, the de-oiled gums are readily flowable but nevertheless it is usually desirable to dilute such gums with water from the tank 101 before delivery into the steam stripper 114 and vacuum stripper 119. The amount of water added should usually be at least enough to produce a mixture containing 1 part by weight of water to 1 part of gums and, if the gums are to be split, the amount of water is usually enough to provide at least 2 parts by weight, and preferably 3 parts by weight, for 1 part of gums on a dry basis. Even more water, for example up to 10 parts to 1 part of gums may be added except for the increased volume of materials in the strippers. The pipe 116 may be employed to add water and this procedure enables the amonia to be removed from any excess water from the jet condenser 92 not otherwise employed in the process. The ammonia vapors as well as any propane vapors liberated in the steam strippers 114 and 119 are delivered back to the absorber 107 through the pipe 117. The propane vapors pass through the absorber 107 and are delivered to the jet condenser 92 through the pipe 118.

The aqueous suspension of de-oiled gums from which the ammonia and propane have been removed collect in the lower portion of the vacuum stripper 119 and may be pumped therefrom by the pump 123 under control of the float valve 124. These are high grade undecomposed gums and are predominantly oil-free phosphatides. They may be discharged from the process through the pipe 126 and may be sold commercially, after vacuum drying, as oil-free phosphatides or lecithin, particularly in the case of such oils as soyabean oil or corn oil. The gums may, however, be enhanced in value by splitting them into the component parts. By subjecting the gums to elevated temperatures, for example temperatures in the neighborhood of 375° F., under pressure and in the presence of an excess of water, the gums may be split to liberate a plurality of valuable products. The time of treatment to accomplish this splitting operation at the temperature mentioned will usually be in the neighborhood of 3 to 8 hours, 4 hours usually being sufficient at such temperature. By employing somewhat higher temperatures, for example temperatures of 400° to 500° F., shorter times may be employed, for example, 15 to 30 minutes.

In the apparatus illustrated, the splitting may be accomplished in splitting chambers 127 and 128 by using these chambers alternately. That is to say, one of these chambers may be employed for splitting and then emptied while the other is being filled. The gums being split are preferably maintained under vigorous agitation by the agitator 132 and the heating coil 131 may be employed to bring the temperature of the gums being split to the desired temperature. The amount of water present during splitting will range between 2 and 10, and will usually by between 3 and 5, times the weight of the gums on a dry basis. Most of this water is usually added before the gums are passed through the steam and vacuum strippers 114 and 119, in order to dilute the gums during stripping and also to recover ammonia from the water from the tank 101. Additional water may, however, be added through the pipes 129.

The split gums may be delivered from the heat exchanger 133 into a settling tank 134. The heat exchanger 133 may be employed to reduce the temperature of the split materials to a temperature below the boiling point of water, for example, temperatures ranging from 70° to 200° F., although it is possible to flash the split products to atmospheric pressure so as to evaporate some of the water and reduce the temperature of the mixture to approximately the boiling point of water. The split products readily separate into two layers, the upper and lighter layer being fatty material insoluble in water and the lower layer being an aqueous layer containing water-soluble materials. A small amount of an intermediate layer usually forms and this intermediate layer may be separately recovered or recovered with either the fatty layer or the aqueous layer. Continuous centrifugal separation may be substituted for the settling step illustrated, in which case most of the intermediate layer separates with the fatty layer.

The upper or fatty layer is predominantly fatty acids but usually contains a substantial amount of sterols and is a marketable product for its fatty acid and sterol content. The sterols and fatty acids may, however, be decolorized and separated as disclosed in my copending application, Serial No. 200,459, filed December 12, 1950, to produce high grade low colored fatty acids and high grade sterols.

The lower layer contains substantial proportions of inositol, choline and numerous complex compounds high in phosphorous and nitrogen or both, as well as glycerine, and is a rich source of vitamin B complex. The lower layer may, for example, be merely evaporated to dryness and the solid material recovered is a valuable material marketable for addition to stock feeds, etc. This material may, however, be further treated to separately recover the inositol, choline and phosphorous-containing compounds as well as any glycerine present, as also disclosed in my copending application referred to above.

As another modification of the process, the second procedure above discussed may be employed. In such case, ammonia is added to the degumming agent so that it is present during degumming. The amount of ammonia thus added is preferably not sufficient to neutralize all of the free fatty acids present in the oil but preferably is added in an amount sufficient to convert a portion, for example, 10 to 25% of such free fatty acids into ammonia soap. This operation neutralizes approximately the amount of free fatty acids which would ordinarily be separated with the gums in the centrifugal separator 28 and the advantage of adding ammonia during degumming is that the gums are thereby liquefied and more readily separated from the oil. A cleaner separation of the gums is thereby obtained and the soapstock obtained from the alkali refining can more readily be converted into high grade fatty acid. In such process, however, the centrifugal separator 28 should be of the hermetically sealed type to prevent escape of ammonia into the atmosphere and the hopper 56 should be closed and connected to the spout 34 in an airtight manner for the same purpose.

It is also possible to completely neutralize the free fatty acids in the oil during the degumming operation by employing an excess of ammonia, in which case substantially all of the free fatty acids are separated as ammonia soaps with the gums. The degumming step, in effect, becomes an ammonia refining step but since ammonia alone is not, in general, effective to completely refine a glyceride oil, an alkali refining step must ordinarily be employed in any event and in most cases, it is more economical to remove the major portion of the free fatty acids originally in the oil in the alkali refining step in order to reduce the bulk of materials handled in the de-oiling, ammonia removal and splitting steps. Since ammonia is already present in the gums delivered to the mixer 58, the mixer 58 is then used merely to add diluting water through the pipe 59, or if desired, additional ammonia can also be added through the pipe 61 in order to insure that all free fatty acids contained in the gums are converted into ammonia soaps. The remainder of the process including the de-oiling steps may be identical with that described above.

As another and third modification of the process, the de-oiling may be carried out without using ammonia. In this case, the mixer 58 is employed to add diluting water through the pipe 59 and is usually also employed to add any necessary heat to the mixture in order to bring the temperature of the gums up to at least 140° F. so that they will readily flow and be capable of being pumped by the pump 64 into the de-oiling chambers 66 and 67. The amount of water will usually be that sufficient to bring the water content of the gums to between 65 and 75% by weight. Propane is added to the appropriate chamber 66 and the heating coil 72 in such chamber is employed to bring the mixture to an appropriate separation temperature which may range between 120 and 200° F. Temperatures in the neighborhood of 150° to 170° F., for example 158° F., are usually employed since very effective separation is accomplished at this temperature and temperatures higher than necessary increase the requisite pressure which must be maintained in the de-oiling chambers 66 and 67 in order to maintain the propane in liquid form. Thus the pressure at 200° F. is approximately 560 lbs. per square inch gauge while the pressure at 150° to 170° F. is approximately 360 to 420 lbs. per square inch gauge while that at 120° F. is approximately 230 lbs. per square inch gauge and that at 158° F. is approximately 365 lbs. per square inch gauge. Again, an oil-solvent phase forms but in this case the oil-solvent phase also contains the free fatty acids and these free fatty acids are separated with the oil and returned to the crude oil supply tank 18. A circulation of fatty acids is thus set up in the degumming and de-oiling system but the majority of the fatty acids are discharged with the oil from the centrifugal separator 28 and substantially all of the free fatty acids eventually appear as soap in the soapstock separated from the oil in the centrifugal separator 41 and collect in the soapstock receiver 52.

In the latter modification of the process, the ammonia vaporizing chamber 103 as well as the ammonia absorber 107 and ammonia storage tank 111 are omitted. Also the pump 75 may be omitted in most cases because of the higher pressure in the chambers 66 and 67, but otherwise the apparatus employed may be the same as that illustrated in Fig. 1. The propane recovery and storage system will also usually be operated at a higher temperature and pressure. For example, the temperature of the propane in the storage tank may be 120° F. in which case the pressure therein and in the condenser 84 and flash chamber 81 will be approximately 230 lbs. per square inch gauge. Also, the liquid propane may be preheated to the desired temperature of separation in the chambers 66 and 67 before being introduced into these chambers. This modification of the process has the advantage that less volume of material is present in the splitting chambers 127 and 128. The products obtained are, however, substantially the same except that a lesser amount of fatty acids are recovered from the split products, the fatty acids which are returned to the degumming system with the oil separated from the gums eventually being separated in the form of soap in the soapstock from the alkali refining step.

As stated above, the continuous de-oiling step which may be carried out in the apparatus of Fig. 2 may be substituted for the batch de-oiling steps carried out alternately in chambers 66 and 67. The continuous de-oiling step thus effected can be employed in all of the modifications of the process above described and has the advantage that less operating personnel is ordinarily required. Since the continuous de-oiling chamber 139 is usually maintained completely full of liquid, the pressure therein will usually be somewhat higher than that corresponding to the vapor pressure of propane at the temperature of the materials therein but the temperatures for effecting de-oiling will remain approximately the same. The oil from any of the de-oiling steps of the present invention is preferably delivered back to the crude oil as it will ordinarily contain a small amount of gums which are removed in the degumming step and eventually recovered as de-oiled gums, but such oil may alternatively be delivered directly to the alkali refining step, if desired.

While the present process has been discussed primarily with respect to the degumming of edible oils such as cotton seed, corn and soyabean oil and the recovery of oil from separated gums, other glyceride oils such as paint oils, for example, linseed oil, can be advantageously degummed and valuable oil recovered from the separated gums in accordance with the present invention. The de-oiled gums from such other glyceride oils can also be used as phosphatidic material for certain purposes, for example as emulsifying or dispersing agents, or may be further treated to recover valuable products therefrom. Thus such de-oiled gums may be subjected to the splitting treatment described above or such de-oiled gums as well as the de-oiled gums from edible oils may, for example, be treated at high temperatures and pressures while containing ammonia to produce valuable nitriles and amides. Thus the aqueous de-oiled gums from the modifications employing ammonia in the de-oiling step and containing ammonium soaps of any free fatty acids present as well as excess ammonia may be heated to temperatures ranging from 320° to 575° F., under sufficient pressure to prevent substantial vaporization of water or ammonia and for sufficient time to produce a substantial proportion of such nitriles and amides.

I claim:

1. The process of treating crude glyceride oil containing gums, which comprises, degumming said oil by adding an aqueous degumming agent thereto to hydrate said gums and render them insoluble in said oil and separating from said oil hydrated gums containing a substantial amount of said oil, thereafter admixing a liquefied normally gaseous hydrocarbon with the separated hydrated gums and maintaining the resulting mixture under sufficient pressure to retain said hydrocarbon in liquid form, bringing said mixture to a temperature producing a solvent phase containing said liquefied hydrocarbon and said oil and an aqueous phase containing said gums while said gums contain sufficient water to produce a liquid aqueous phase, separating said phases, recovering de-oiled gums from said aqueous phase, and vaporizing said hydrocarbon from said solvent phase to recover oil therefrom.

2. The process as defined in claim 1 in which a volatile water-soluble alkaline material is also present in said mixture in sufficient amount to neutralize any free fatty acids therein and produce water-soluble soaps forming part of said aqueous phase.

3. The process as defined in claim 2 in which said volatile water-soluble alkaline material is present in said aqueous degumming agent during said degumming.

4. The process as defined in claim 2 in which the volatile water-soluble alkaline material is ammonia.

5. The process as defined in claim 4 in which the liquefied normally gaseous hydrocarbon is propane and the temperature during separation of said phases is between 70° and 120° F.

6. The process as defined in claim 5 in which water is added to said separated hydrated gums to bring the water content thereof up to at least 65% by weight.

7. The process as defined in claim 6 in which the amount of propane is between approximately 1.5 and 6 volumes per volume of hydrated gums and water.

8. The process as defined in claim 1 in which water is added to the separated hydrated gums to bring the water content thereof up to at least 65% by weight.

9. The process as defined in claim 8 in which the liquefied normally gaseous hydrocarbon is propane and the temperature during separation of said phases is between approximately 120 and 200° F.

10. The process of recovering oil from hydrated gums separated from crude glyceride oil by a degumming operation, which gums contain a substantial amount of oil, which process comprises, adding a liquefied normally gaseous hydrocarbon to said hydrated gums while said gums contain approximately 65 to 70% water by weight, maintaining the resulting mixture under sufficient pressure to retain said hydrocarbon in liquid form, bringing said mixture to a temperature producing a solvent phase containing oil and an aqueous phase containing gums, separating said phases at said temperature, recovering de-oiled gums from the separated aqueous phase, and vaporizing said hydrocarbon from the solvent phase to recover the last-mentioned oil.

11. The process as defined in claim 10 in which the temberature during said separation is between approximately 120 and 200° F.

12. The process as defined in claim 10 in which sufficient ammonia is present in said mixture during said separation to neutralize the acidity of said gums and convert any free fatty acids present into water-soluble soaps separating with said aqueous phase.

13. The process as defined in claim 12 in which the temperature during said separation is between approximately 70 and 120° F.

14. The process of recovering oil and other valuable products from hydrated gums separated from crude glyceride oil by a degumming operation, which gums contain a substantial amount of oil, which process comprises, adding a liquefied normally gaseous hydrocarbon to to said hydrated gums while said gums contain approximately 65 to 70% water by weight, maintaining the resulting mixture under sufficient pressure to retain said hydrocarbon in liquid form, bringing said mixture to a temperature producing a solvent phase containing oil and an aqueous phase containing gums, separating said phases at said temperature, vaporizing said hydrocarbon from the solvent phase to recover the last-mentioned oil, subjecting said aqueous phase to a high temperature splitting operation, and separating the split products into a fatty acid phase and an aqueous phase.

15. The process as defined in claim 14 in which sufficient ammonia is present during the separation of the solvent phase from the first-mentioned aqueous phase to neutralize the acidity of the hydrated gums and convert any fatty acids present into water-soluble soaps and the ammonia is removed from the first-mentioned aqueous phase prior to said splitting operation.

16. The process as defined in claim 14 in which the amount of water present during said splitting operation is between 1 and 10 volumes per volume of gums on a dry basis.

References Cited in the file of this patent

UNITED STATES PATENTS

| Number | Name | Date |
|---|---|---|
| 2,288,441 | Ewing | June 30, 1942 |
| 2,329,889 | Ewing | Sept. 21, 1943 |
| 2,416,146 | Black et al. | Feb. 18, 1947 |

Dedication 2,678,327.—*Benjamin Clayton*, Pasadena, Calif. PROCESS OF TREATING GLYCERIDE OIL. Patent dated May 11, 1954. Dedication filed June 30, 1964, by the inventor.

Hereby dedicates to the public the terminal part of the term of said patent effective December 31, 1963.

[*Official Gazette September 29, 1964.*]